United States Patent
Suwito et al.

(10) Patent No.: US 7,181,824 B1
(45) Date of Patent: Feb. 27, 2007

(54) METHOD OF INSTALLING A DISK CLAMP OVER A HUB OF A DISK DRIVE

(75) Inventors: Wantjinarjo Suwito, Longmont, CO (US); James D. Fahey, Farmington, CA (US)

(73) Assignee: Maxtor Corporation, Scotts Valley, CA (US)

( * ) Notice: Subject to any disclaimer, the term of this patent is extended or adjusted under 35 U.S.C. 154(b) by 327 days.

(21) Appl. No.: 10/753,802

(22) Filed: Jan. 7, 2004

Related U.S. Application Data (62) Division of application No. 10/123,275, filed on Apr. 15, 2002, now Pat. No. 6,816,338.

(60) Provisional application No. 60/304,262, filed on Jul. 9, 2001.

(51) Int. Cl.
G11B 5/127 (2006.01)
H04R 31/00 (2006.01)

(52) U.S. Cl. .............................. 29/603.03; 29/603.04; 29/729; 360/98.05; 360/98.06; 360/98.07; 360/98.08; 360/99.12; 369/270; 369/271

(58) Field of Classification Search ............ 29/603.03, 29/603.04, 729; 360/98.05–98.08, 99.12; 369/270, 271
See application file for complete search history.

(56) References Cited

U.S. PATENT DOCUMENTS

| | | | |
|---|---|---|---|
| 4,639,802 A | 1/1987 | Neubauer et al. ............ 360/98 |
| 5,274,517 A | 12/1993 | Chen ........................ 360/98.08 |
| 5,333,080 A | 7/1994 | Ridinger et al. ......... 360/99.12 |
| 5,490,024 A | 2/1996 | Briggs et al. ............ 360/99.12 |
| 5,517,376 A | 5/1996 | Green ..................... 360/98.08 |
| 5,528,434 A | 6/1996 | Bronshvatch et al. .... 360/98.08 |
| 5,777,832 A | 7/1998 | Yi et al. .................... 360/135 |
| 5,790,345 A | 8/1998 | Alt .......................... 360/98.08 |
| 5,790,346 A | 8/1998 | Fletcher ................... 360/99.12 |
| 5,880,906 A | 3/1999 | Lindrose .................. 360/98.08 |
| 5,940,244 A | 8/1999 | Canlas et al. ............ 360/98.08 |
| 6,417,988 B1 * | 7/2002 | Renken et al. .......... 360/99.12 |
| 6,542,330 B1 * | 4/2003 | Choo et al. .............. 360/99.12 |
| 6,624,968 B1 * | 9/2003 | Chessman et al. ....... 360/99.12 |

* cited by examiner

Primary Examiner—Paul D. Kim
(74) Attorney, Agent, or Firm—Brent P. Johnson

(57) ABSTRACT

A disk clamp is provided for securing one or more data storage disks to a disk drive without the need for screws. A preloading device is also provided for installing the disk clamp and removing the disk clamp after installation. The preloading device applies a load to the clamp to deflect the clamp, and allows a retaining ring to be positioned between the disk clamp and the hub of the disk drive. Preloading the disk clamp helps to reduce disk drive contamination, potential damage to the motor hub, and improves reworkability of the disk drive. The preloading device can be incorporated within a manually manipulated preloading device, or within an automated assembly process in which the preloading device is incorporated. Methods are also provided for clamp preloading and clamp installation.

43 Claims, 8 Drawing Sheets

Fig_2

Fig_4

Fig_8

Fig_9

Fig_10

Fig_14

Fig_15

Fig_16

Fig_17

Fig_18

Fig_19

METHOD OF INSTALLING A DISK CLAMP OVER A HUB OF A DISK DRIVE

CROSS REFERENCE TO RELATED APPLICATION

The present application is a divisional of U.S. patent application Ser. No. 10/123,275, filed Apr. 15, 2002, now U.S. Pat. No. 6,816,338 entitled DISK CLAMP FOR DISK DRIVE, AND APPARATUS AND METHOD FOR PRE-LOADING DISK CLAMP", which is incorporated herein by this reference.

Priority is claimed from U.S. Provisional Patent Application No. 60/304,262, filed on Jul. 9, 2001, entitled "Screwless and Preloadable Disk-Clamp for Rigid Disk Files", the disclosure of which is incorporated herein by reference in its entirety.

FIELD OF THE INVENTION

The present invention relates to computer disk drives, and more particularly, to a disk clamp for a disk drive, and an apparatus and method for preloading the disk clamp in order for installation within the disk drive.

BACKGROUND OF THE INVENTION

Disk drive data storage systems typically include one or more data storage disks mounted to a spindle hub, and a spindle motor drives the spindle hub which rotates the disks at high RPMs. A disk clamp assembly secures the disks to the hub.

Data disks have a central bore or opening that receives the spindle hub. A common type of disk clamp assembly includes an annular or disk-shaped disk clamp, and a number of screws that secure the clamp to the hub. One or more disks positioned below the clamp are secured to the hub. In addition, spacers may be placed between each disk. For example, in a disk drive with a single data disk, the arrangement could include in series, a clamp, a spacer adjacent the clamp, a disk, a spacer on the opposite side of the disk, and then the hub. For some disk clamp assemblies, a top data disk may directly contact the disk clamp without the use of a spacer. The disks and spacers are often referred to as a disk pack.

Examples of references disclosing clamps utilizing securing screws include the U.S. Pat. Nos. 5,274,517, 5,333,080, 5,528,434, and 5,790,345.

Certain disadvantages arise by using screws to secure the clamp to the hub. One distinct disadvantage is that the screws transmit irregular radially and axially directed forces to the data disk, thus resulting in surface irregularities on the disk. Any distortion or surface irregularities of the disk read/write surface may result in poor head transducer flight characteristics. Another disadvantage is that use of screws contributes to disk contamination. Particle generation occurs when the screws are driven for attaching the clamp. More specifically, particle generation can be attributed to screw-to-hole and screw-to-driver misalignments, excessive force transferred through a single screw, excessive friction for the screw to overcome when being driven, and other reasons as well. In order to rectify these problems, efforts can be made to redesign screw-to-driver interface, improve tool alignment for driving the screw, and even lubricating the screw. Each of these solutions may involve significant redesign of not only the screws and the tools used to drive the screw, but may also require disk clamp redesign. Furthermore, lubrication of the screws can cause contamination by introduction of a substance into the disk drive which itself is a contaminant, or which attracts contaminants.

Another type of disk clamp exists which does not require the use of screws to secure the clamp to the hub. Presumably, these types of clamps help to reduce undesirable radial or axial loading and also help to reduce contamination. One example of a clamping device which does not require the use of screws to secure a clamp to the hub includes the device disclosed in the U.S. Pat. No. 5,270,999. The disk clamp disclosed in this references has a flat lower surface which directly contacts the data disk. The central opening of the clamp includes an inner conical surface. The upper end of the hub includes a groove having a complementary conical or angled surface. When the clamp is mounted over the hub, a uniform circumferential gap exists between the conical surfaces. A clip or retaining ring is placed in the gap between the conical surfaces. When the retaining ring is in place, the clamp resists axial force that may act to disengage the disk from the hub. In addition to the clip or retaining ring, an O-ring is also used to stabilize the disk with respect to the hub. The clamp disclosed in the U.S. Pat. No. 5,270,999 provides very little axial force to secure the disk or disks to the hub. Thus, the O-ring must be used to help prevent radial movement of the disk with respect to the hub. There is always some small gap between the inner edge of the disk defining the central opening and the outer surface of the hub. This gap can allow radial movement of the disk with respect to the hub if no force is provided to prevent such radial movement.

The current method used for installing a screwless clamp involves the use of a press device which deflects the clamp after the clamp has been placed over the hub of the disk drive. Additionally, this method also involves placing a load on the retainer ring as the retainer ring is placed in the gap between the hub and the disk clamp. Therefore, in addition to the force which is needed to deflect the clamp, additional force is required to overcome the friction between the retainer ring and the edge of the interior or central opening of the disk clamp such that the retainer ring can slide or move into the gap between the hub and the clamp. Also in this method, because the disk clamp is loaded and mounted for use over the hub, structure is required to stabilize the hub to prevent damage to the hub. The data disks themselves must be prevented from spinning, and the current solution for this is to create holes in the housing or baseplate of the disk drive, and then spanners are placed in contact with the lower edge of the disk pack to prevent it from spinning. Thus, the current method of installing a disk clamp still subjects the disk drive to contamination and potential damage. Therefore, even in the case of a screwless clamp, there are certain problems which arise in installing the disk clamp.

Therefore, there is a need to provide an apparatus and method which allows for easy and reliable installation of a disk clamp, yet minimizes potential damage to the disk drive, and also simplifies the tools/equipment which must be used to install the disk clamp. Accordingly, there also is a need for a screwless disk clamp of the type which accommodates the apparatus and method for installing the disk clamp.

SUMMARY OF THE INVENTION

In accordance with the present invention, a disk clamp and an apparatus and method for preloading the disk clamp are provided. The invention may also be regarded as a combination of the disk clamp, along with the apparatus for preloading the disk clamp. The invention herein is also intended to cover various subcombinations of this combination, including various elements used within the preloading apparatus. Additionally the invention herein is also intended to cover methods of installing the disk clamp in the disk drive incorporating the method of preloading the disk clamp.

In a preferred embodiment of the disk clamp, the disk clamp includes a lower flange or proturbance which contacts an underlying spacer or disk. When an external load is applied to set the clamp, the disk clamp itself acts as a spring in that it deflects downward in response to the applied load. After a retaining ring is placed in a gap between a groove on the hub and the clamp, the load is removed which enables the disk clamp to spring back to its undeflected state; however, the retaining ring prevents full return resulting in the retaining ring being wedged between the clamp and the hub. A continuous wire ring retaining ring may be used, a cutring, or multiple sections of wire arcs may be inserted between the clamp and the hub.

Other structural features of the disk clamp include an upper groove formed in the upper surface of the clamp for receiving a balance ring, and one or more lower concentric grooves. These lower concentric grooves help to distribute the load of the clamp on the underlying disk pack. Specifically, the ability to vary and control the load transmitted from the disk clamp to the disk pack minimizes deflection known as disk coning and waviness. Preferably, the contact surface of the lower flange is flat, which further reduces undesirable radial loading thus reducing disk coning and waviness. The larger contact area provided by the flat contact surface of the lower flange better compensates for locational misalignment between the clamp and a disk pack which naturally occurs due to tolerances in the manufacture of the clamp and of the disks. Particle generation resulting from movement of the contact surface relative to the disk is minimized thereby reducing disk drive contamination. The flat contact surface of the clamp remains in its contact position against a disk/spacer even during thermal cycles. Thus, there is no movement or displacement between the clamp contacting surface and the underlying disk/spacer. A rounded disk contact surface may displace (e.g., curl/uncurl) in response to thermal cycles which contributes to undesirable particle generation caused by a movement of the contact surface across the underlying disk/spacer.

The disk clamp of the present invention eliminates the need for using screws to secure the clamp to the hub. The clamp provides an axial force upon the disk pack which prevents the disk(s) from both axial and radial displacement with respect to the hub. O-rings or other stabilizing elements are not required to stabilize the connection between the disk pack and the hub because of the axial force which is provided by the disk clamp.

The method of preloading the disk clamp according to the present invention contemplates the use of a preloading device which secures the disk clamp, and deflects the disk clamp a desired amount allowing the disk clamp to be positioned over the hub of the disk drive for installation of the disk clamp. The method of preloading the disk clamp can also be included within a method of installing the disk clamp in the disk drive. Accordingly, the invention herein not only includes the method of preloading the disk clamp, but also includes a method for disk clamp installation on the disk drive. The method of installing the disk clamp can be incorporated either within displacement or movement of the disk drive assembly to the preloaded disk clamp, or movement/displacement of the preloaded disk clamp to a stationary disk drive.

The preloading device of the invention is disclosed in reference to three preferred embodiments. Common to each of these embodiments is application of an axial force which deflects the disk clamp and maintains the disk clamp in its deflected state. The preloading device also includes a component for emplacing the retainer ring after the deflection of the clamp. The preloading device may be manually operated, or may be incorporated within an automated assembly or rework process. In a first embodiment of the preloading device, the disk clamp is secured within the preloading device, and means are provided for applying a load to deflect the disk clamp. The means for loading may include a handle which provides the desired mechanical advantage in application of the load to the clamp. The preloading device may then be moved to the location of the disk drive for installation of the disk clamp. A separate component is used to emplace the retainer ring. This component is inserted into an opening within the preloading device, and is then operated to force the retainer ring between the hub of the drive and the clamp.

In a second embodiment of the preloading device, means are provided for applying load to the disk clamp in the form of an overhead press assembly which may be incorporated within an automated assembly process. Integrated within this press assembly are components for emplacing the retainer ring as well. In this embodiment, it is contemplated that the disk clamp remain stationary within the preloading device, and then the disk drive assembly is moved to the preloaded disk clamp for installation of the disk clamp.

In a third embodiment of the preloading device, means are provided for applying a load to the clamp by use of a screw type press which can be either manually or automatically operated. As with the first and second embodiments, the third embodiment also includes a component for emplacing the retainer ring to complete installation of the disk clamp within the disk drive.

The disk clamp of the present invention, along with the methods of preloading and installation, and the various preloading devices each have a number of advantages. Use of a screwless disk clamp simplifies the overall disk clamp and hub arrangement, thus minimizing the cost of fabrication and assembly, reducing the likelihood of malfunction in the disk drive system, and providing effective and consistent disk drive performance. A preloading device which is able to preload the disk clamp further reduces potential disk drive contamination and damage. The preloading device further simplifies the construction of the disk drive because there is no need to provide additional support to the hub during clamp installation, and no separate means are required to prevent the disk pack from spinning during the installation.

Other advantages of the invention will become apparent from a review of the following detailed description, taken in conjunction with the accompanying drawings.

DETAILED DESCRIPTION OF THE INVENTION

Figure 1:
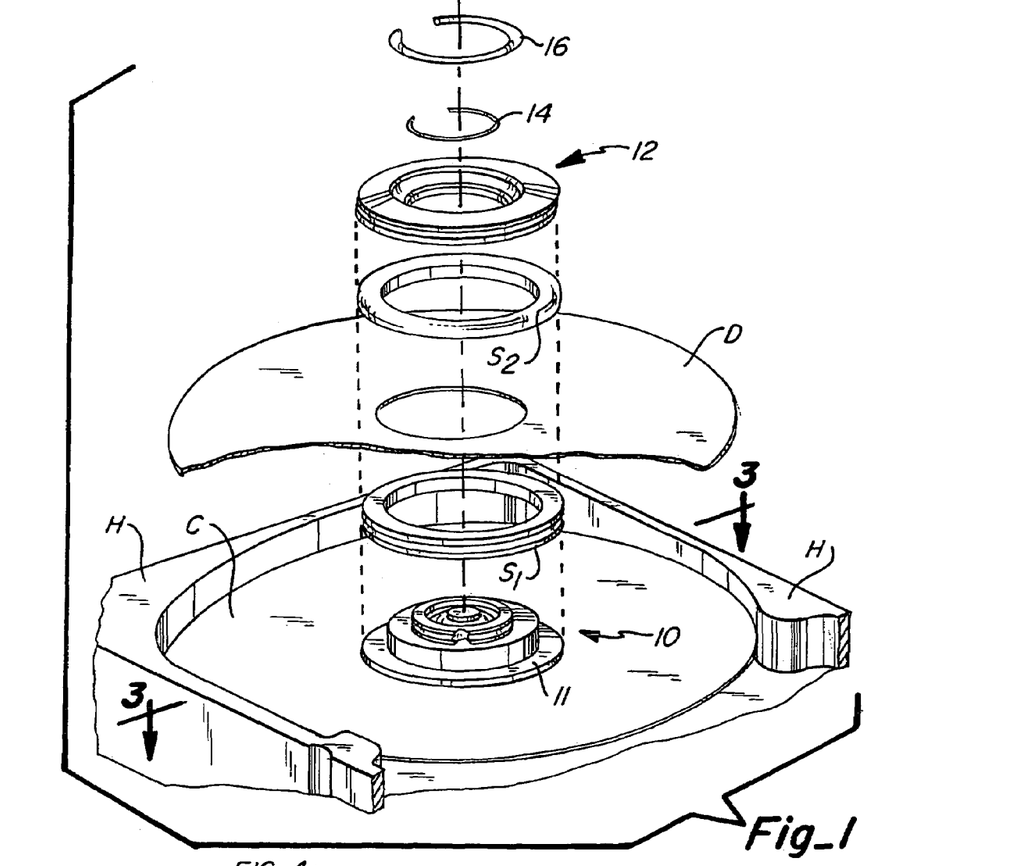
FIG. 1 is an exploded perspective view of a hub and disk assembly of the disk drive, including the disk clamp of the present invention.

Referring now to the drawings and specifically to FIG. 1, a disk drive includes a housing H, a chamber C formed in the housing for receiving one or more data disks D and one or more corresponding spacers $S_1$ and $S_2$. FIG. 1 illustrates a single disk D disposed between a pair of spacers $S_1$ and $S_2$. If no upper spacer were used, the disk clamp would directly contact the disk. It shall be understood that the clamp of the present invention is usable with a single disk or multiple data disks depending upon the configuration of the disk pack.

Figure 2:
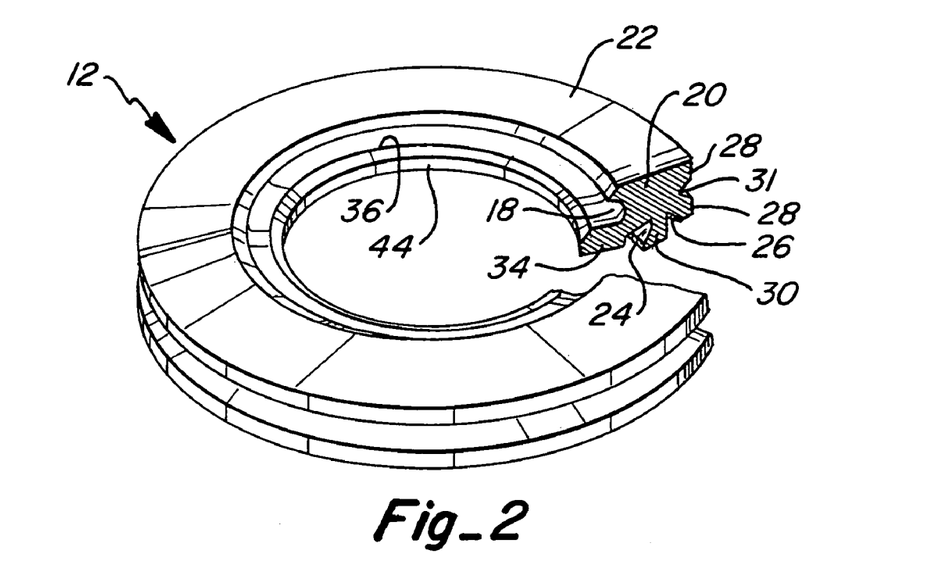
FIG. 2 is an enlarged fragmentary perspective view of the disk clamp.
Figure 4:
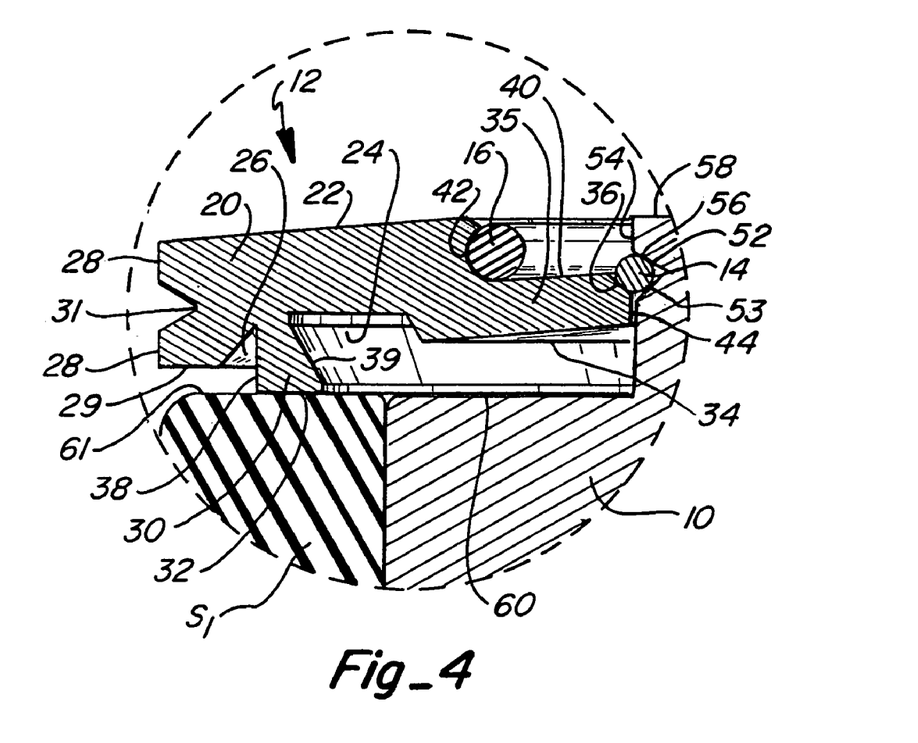
FIG. 4 is a greatly enlarged section of FIG. 3.

Now also referring to FIGS. 2 and 4, when the disk drive is assembled, the lower spacer $S_2$ rests upon a lower flange 11 of the hub 10. The disk D rests on the lower spacer $S_2$, and an upper spacer $S_1$ is placed on top of the disk D. The disk clamp 12 of the present invention contacts the upper surface of the upper spacer $S_1$. As mentioned above, if an upper spacer is not used the disk clamp would directly contact the disk D. When an external axial load is applied to the clamp 12, the clamp is deflected and a retaining ring 14 is inserted into a gap between a concentric groove formed on the hub 10, and an inner surface defining the central opening of the clamp 12.

Figure 3:
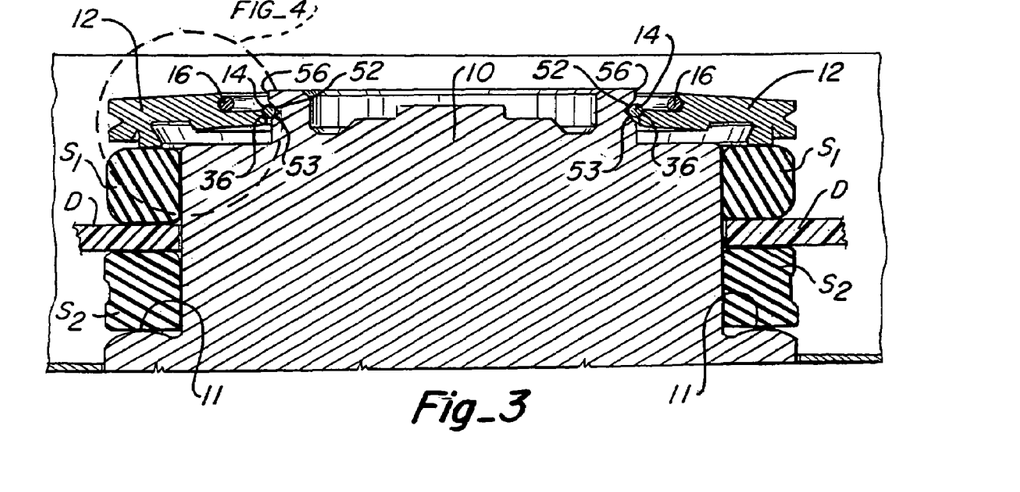
FIG. 3 is a vertical section illustrating the manner in which the disk clamp secures the disk and associated spacers.

Now referring to FIGS. 2 and 3, the construction of the clamp 12 is best seen. Clamp 12 includes an annular main body portion 20. Extending downward from the main body portion 20 is a lower flange/proturbance 30. Lower flange 30 is continuous and annular, and is situated between a pair of lower concentric grooves, namely lower inner concentric groove 24 and lower outer concentric groove 26. A balance ring 16 is inserted within an upper groove 18 (see FIG. 2) formed on the upper surface of the clamp 12.

As shown in FIG. 4, it is seen that the lower flange 30 has a trapezoidal shape in cross-section, and a lower flat surface 32. However, it shall be understood that lower surface 32 could also be rounded or curved, and the flange 30 could have other cross-sectional shapes to include a more rectangular configuration. Thus, the cross-sectional shape is determined by the opposing walls or radial surfaces 38 and 39. It is also shown that the lower outer concentric groove 26 has a v-shaped cross-section. As desired, the groove 26 could be modified to have a different shape to include a more rectangular shaped cross-section. The peripheral edge 28 of the disk clamp extends substantially perpendicular to the upper surface 22 of the disk clamp. An outer lower surface 29 of the disk clamp resides between the peripheral edge 28, and the lower outer concentric groove 26. A lower interior edge 34 of the disk clamp can be defined as the portion of the disk clamp radially inward of the lower inner concentric groove 24. As shown in FIG. 4, the lower interior edge 34 slopes radially downward from the central opening of the disk clamp towards the inner concentric groove 24. Similarly, the upper surface 22 of the main body portion may slope slightly radially downward from the central opening to the peripheral edge 28.

A peripheral groove 31 is formed in the peripheral edge 28. The peripheral groove 31 is illustrated as having a v-shape. However, it shall also be understood that the peripheral groove 31 can be of other shapes which provide some indentation in the peripheral edge 28. For example, it is further contemplated that a continuous notch or groove could be formed in the peripheral edge 28 such that the peripheral groove 31 could be a rectangular cross-section. Alternatively, the entire upper or lower portion of the peripheral edge could be removed forming a groove which extends to the upper surface 22 or lower outer surface 29. A lower circumferential lip can be defined as the portion of the disk clamp between the peripheral groove 31 and the outer concentric groove 26.

A web section 35 of the clamp may be defined as the portion of the disk clamp below the upper groove 18 and extending radially inward to the central opening of the clamp. The central opening may be specifically defined by a chamfered or conical edge 36, and a substantially vertical inner surface 44 extending below the chamfered edge 36. As best seen in FIG. 4, the retaining ring 14 when emplaced is situated between a groove in the hub and the chamfered edge 36. FIG. 4 also illustrates in better detail the specific shape of the upper groove 40. As shown, the groove 18 may be defined by an arcuate portion 42, and a flat portion 18 which extends radially inward from the arcuate portion 42.

Now further referring to FIG. 4, the hub 10 includes a notch or groove which receives the retaining ring. The upper portion of the groove defined by surface 52 communicates with a vertical surface 54. A lip or projection 56 is defined as that portion of the hub between the upper surface of the hub 58 and the upper portion 52. The lower portion of the groove defined by surface 53 extends perpendicular to surface 52.

As seen best in FIG. 4, surface 52 ensures the retaining ring 14 is urged towards the center of the hub. Surface 53 ensures the retaining ring 14 is at the proper height. The position of the retaining ring determines the position of surface 36 of the clamp 12, and thus the magnitude of the load applied to the clamp. The groove defined by surfaces 52 and 53 and the surface 36 of the clamp consistently trap and lock the retaining ring in place.

As also shown in FIG. 4, the hub 10 includes an annular flange 60 which is provided at a height so that a definable gap exists between it and the lower surface 34 of the clamp 12. Because the lower flange 30 does not completely cover the upper surface 61 of the spacer $S_1$, the gap extends from the central opening of the clamp to the most inner concentric surface 39 of the flange 30.

Once the disk clamp 12 is positioned over the hub 10, an axial load is applied to the web 35 to deflect or set the clamp. As discussed further below, the axial load may be applied by the preloading device of the invention. In response to the axial loading, the clamp deflects downward, thus increasing the gap between the chamfered edge 36 and surfaces 52 and 53 defining the groove 5 of the hub. Accordingly, the gap is narrowed between the lower surface 34 of the clamp, and the upper surface 60 of the hub flange. In the clamp's deflected state, the retaining ring 14 can then be placed in the gap between the hub and disk clamp. When the axial load is removed, the clamp springs back to achieve its undeflected state; however, the retaining ring 14 prevents full return resulting in the retaining ring being wedged between the clamp and the hub. The specific design of the web 35 can be modified to determine the degree of force which is exerted by the clamp upon the disk pack. A web having a greater mass/cross-section would be more difficult to deflect, therefore requiring a greater axial load to achieve deflection, which in turn would result in the clamp exerting a greater force on the disk pack. Whether a disk drive includes one or multiple disks, the clamp of this invention eliminates not only the need to use securing screws, but also eliminates the need to use o-rings or other stabilizing features normally required to prevent radial displacement of the disks with respect to the hub. Contamination is reduced as well because screws are not used to set the clamp.

In conjunction with the disk clamp 12 described above, the invention herein also includes various embodiments of a device which is used to preload the disk clamp, and to maintain the disk clamp in a deflected state for installation in the disk drive. The preloading device of this invention also facilitates installation of the retainer ring, and removal of the load to allow the disk to return to its undeflected state, thus completing disk clamp installation. The primary steps in installing a disk clamp using the preloading device of the invention include securing the disk clamp in the preloading device, manipulating the preloading device to apply a load to deflect the clamp, positioning the preloading device over the disk drive and aligning the clamp over the hub, installing the retainer ring, and manipulating the preloading device to release the load. The step of positioning the preloading device and aligning the clamp can be achieved either by movement of the preloading device to the disk drive, or movement of the disk drive to the preloading device.

Figures 5, 6, 7:
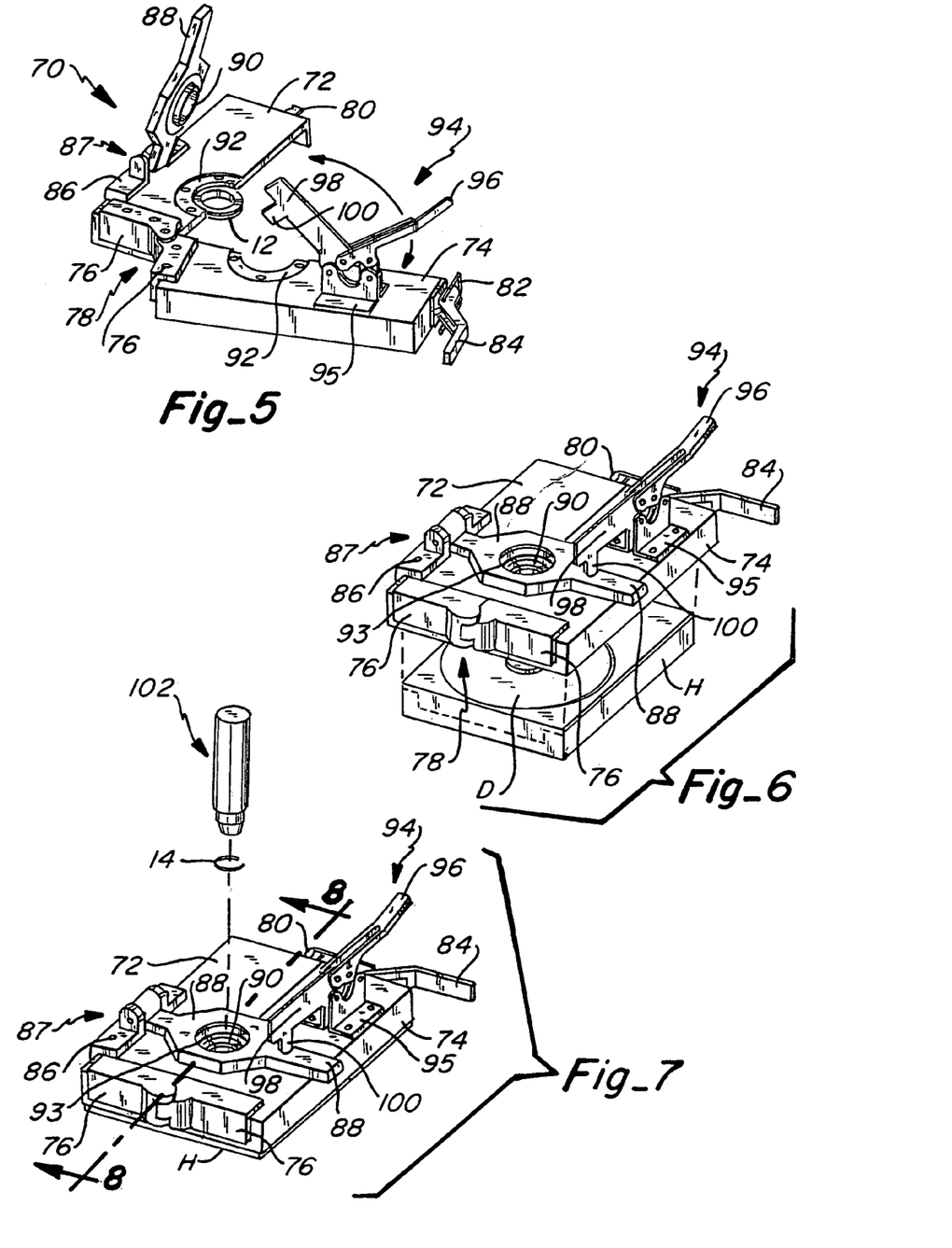
FIG. 5 is a perspective view of a first embodiment of the preloading device of this invention.
FIG. 6 is another perspective view of the preloading device of FIG. 5, illustrating the device prior to mounting over the base of a disk drive.
FIG. 7 is another perspective view of the preloading device of FIGS. 5 and 6, illustrating the device mounted over a disk drive.

FIG. 5 illustrates a first embodiment of the preloading device 70. This first embodiment may also be referred to as a manual preloading device because the load applied to the clamp is achieved by the user manually manipulating the device. As shown in FIG. 5, the preloading device 70 includes two frame halves 72 and 74 which are joined by hinge 78. Hinge 78 comprises hinge supports 76 which are attached to each of the frame sections 72 and 74. A disk clamp 12 is shown as being loaded within the preloading device 70. In order to prepare the disk clamp for loading, the frame halves 72 and 74 are rotated to a closed position and then components latch or lock the frame halves in place. The locking device shown in FIG. 5 includes a latch post 80 mounted on frame half 72, and a rotatable latch 82 and handle 84 mounted on the other frame half 74. Once the frame halves are rotated towards one another, latch 82 is placed over latch post 80 and the handle 84 is then rotated towards frame half 74 thus locking the frame halves. It is desirable to preload the clamp in such a way that the clamp experiences uniform deflection. Accordingly, an annular shaped implement is used to transmit force to the disk clamp. In connection therewith, the preloading device 70 includes an annular shaped clamp press member 90 which is placed in engagement with the disk clamp 12. The clamp press member 90 is mounted on a rotatable press bracket 88. The press bracket 88 is secured to the preloading device 70 by bracket 86. As seen in FIGS. 6 and 7, the press bracket 88 includes an opening 93 which is centered over the clamp press member 90.

Figure 8:
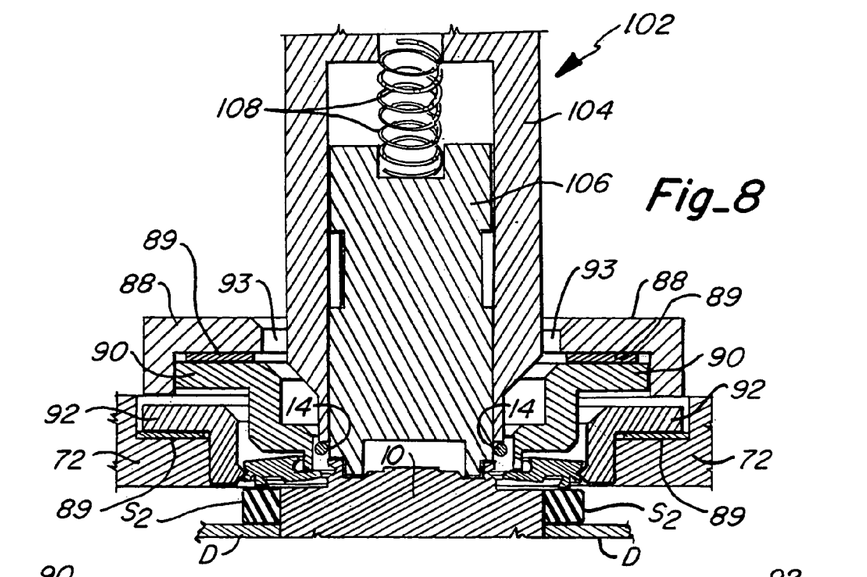
FIG. 8 is an enlarged vertical section illustrating the preloading device mounted over the disk drive, wherein the disk clamp has been preloaded and the retainer ring has yet to be emplaced.
Figure 9:
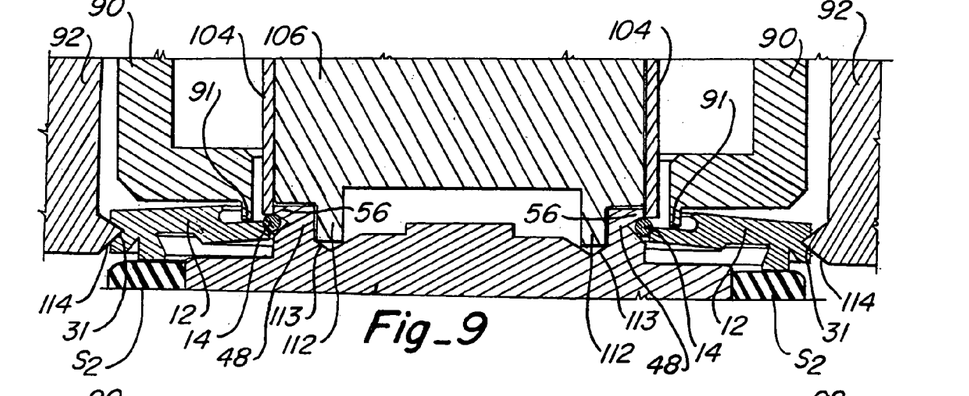
FIG. 9 is a greatly enlarged vertical section illustrating the preloading device mounted over the disk drive, wherein the retainer ring has been emplaced in the groove of the hub.
Figure 10:
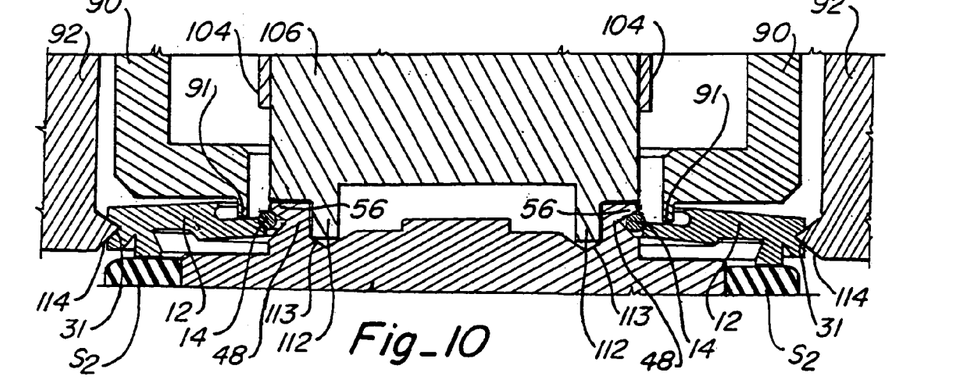
FIG. 10 is another greatly enlarged vertical section illustrating the preloading device mounted over the disk drive, and the retainer ring applicator being disengaged from the retainer ring by upward return of the outer sleeve.

Now, also referring to FIGS. 8–10, clamp press 90 includes a clamp press extension 91 which makes contact with the flat portion 40 of the upper groove 18. The components which hold the clamp 12 within the preloading device include a pair of clamp engaging segments 92 that are inset within corresponding openings formed in the respective frame halves. Optionally, a gasket or shim 89 may be placed between press member 90 and press bracket 88 to provide the necessary height between these elements or to provide additional stability. Additionally, a gasket/shim 89 may also be placed between frame half 72 and clamp engaging segment 92 for the same reasons.

Referring back to FIGS. 5–7, force is transmitted to the disk clamp by a force producing assembly 94. This assembly 94 is manually operated. The components of this assembly include a bracket 95 which is mounted on the upper surface of frame half 74. A handle 96 is rotatably secured to bracket 95. The handle 96, in turn, pivotally connects to force transmitting member 98 such that pressing down on the handle 96 results in downward travel of member 98 to contact press bracket 88. A contact extension 100 extends from the force applying member 98 for contacting press bracket 88. When the press bracket 88 is rotated to position the clamp press member 90 for engagement with disk clamp 12, the clamp press member 90 does not sit flush against the disk clamp 12; rather, the clamp press member is slightly angled such that the leading edge thereof will first contact the flat portion 40. When the handle 96 is rotated to impart a load, the clamp press member 90 is displaced so that it will then sit flush against the disk clamp in order to more uniformly transfer a load upon the disk clamp. In any event, any uneven loading which may be transferred to the disk clamp because of the rotatable manner in which the clamp press engages the disk clamp is negligible. Once the disk clamp has been deflected, the retainer ring 14 may be emplaced.

Now again referring to FIGS. 8–10, the retainer ring is emplaced by a retainer ring applicator 102. The applicator 102 comprises an outer sleeve 104, an inner core 106, and internal spring 108 which biases the outer sleeve 104 with respect to the inner core 106. The retainer ring 14 is positioned over the inner core 106. Preferably, the retainer ring 14 is of a split ring type which enables the retainer ring to hug the core 106. A core contacting flange 112 is formed on the distal end of the inner core 106 and is sized to mate with the particular shape of the hub 10. The core contacting flange 112 may simply be an arcuate shaped member which fits over the hub, and substantially conforms to the upper features of the hub which may include a concentric groove or slot 113. FIG. 8 illustrates the retainer ring applicator 102 inserted through the opening 93 in the press bracket 88 and placed in engagement with the hub 10. In order to emplace the retainer ring, the outer sleeve 104 is depressed, causing the distal edge of the outer sleeve 104 to contact the retainer ring 14. As shown in FIG. 9, the outer sleeve 104 is then fully depressed to cause the retainer ring to slip into the gap between the hub and the disk clamp. FIG. 10 shows the retainer ring 14 in place, and the outer sleeve 104 moved back to its normally unengaged position.

FIGS. 8–10 also illustrate the manner in which the disk clamp 12 is secured within the clamp engaging segments 92. As shown, each of the segments 92 includes a wedge shaped protrusion 114 which mates with the peripheral groove 31 formed on the disk clamp. The protrusions 114 may be continuous around the entire peripheries of their corresponding clamp engaging segments 92.

Figures 11, 12, 13:
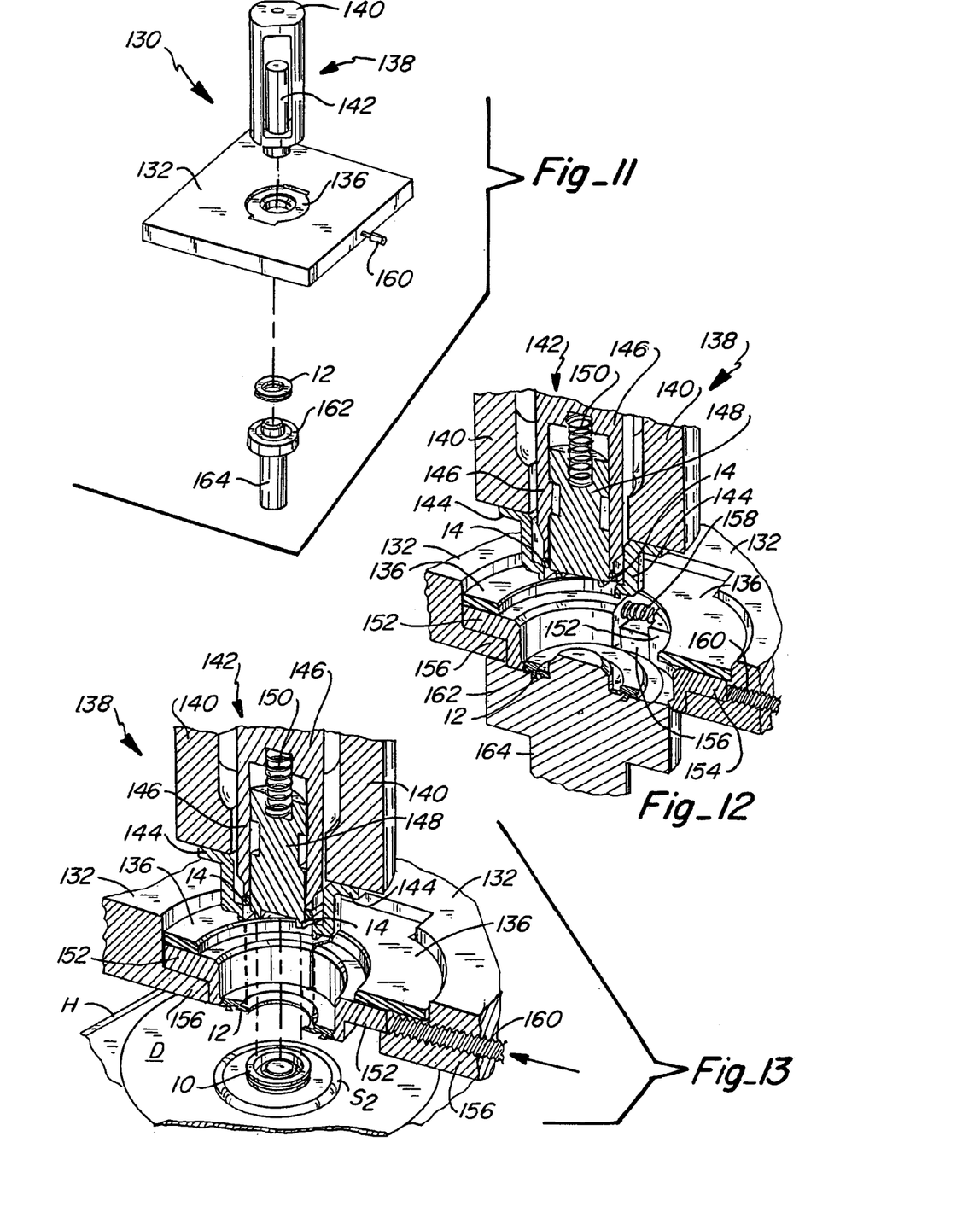
FIG. 11 is a perspective view of a second embodiment of the preloading device of this invention.
FIG. 12 is an enlarged fragmentary perspective view of the preloading device of FIG. 11 and illustrating a disk clamp being positioned for preloading.
FIG. 13 is another fragmentary perspective view of the preloading device of FIG. 12, illustrating a disk drive being aligned under the disk clamp.

Now referring to FIG. 11, a second embodiment of the preloading device of this invention is illustrated. This second embodiment may also be referred to as an automated preloading device 130, which is conducive for use within an automated assembly line process, such as disk drive assembly or rework. The components of this second embodiment shown in FIG. 11 include a press table 132 which has an opening formed therein for receiving a press template 136, and press assembly 138 to deflect the clamp and emplace the retainer ring. The press table 132 may be positioned at a desired height and location within a production facility which assembles or reworks a disk drive. The press assembly 138 has a press adapter frame 140 which houses the component which emplaces the retainer ring, and also supports the component which places a load upon the disk clamp 12.

Referring also now to FIGS. 12 and 13, a retainer ring applicator group 142 is disposed within the adapter frame 140. A clamp press member 144 attaches to the distal end of the frame 140. The press assembly 138 is lowered in alignment with the disk clamp, and a predetermined amount of force is applied to deflect the clamp. The press assembly 138 may be lowered by means of an overhead gantry, (not shown), or some other positioning device which is also able to apply the predetermined amount of force for deflecting the clamp. Various control members may be incorporated within the press assembly to ensure that the desired amount of force is applied to deflect the clamp. For example, known stress and strain measuring devices such as strain gauges and the like may be attached to the disk clamp in order to measure deflection, and thus the amount of force applied. Clamp press member 144 serves the same function as the clamp press member 90 in the first embodiment.

Figure 14:
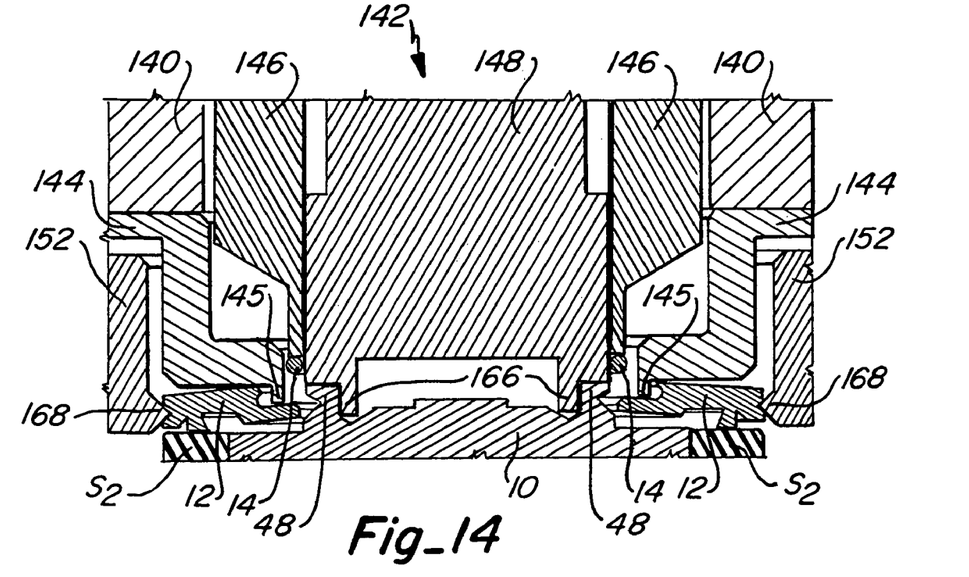
FIG. 14 is an enlarged vertical section illustrating the disk drive mounted in engagement with the preloading device, prior to emplacement of the retainer rings.
Figure 15:
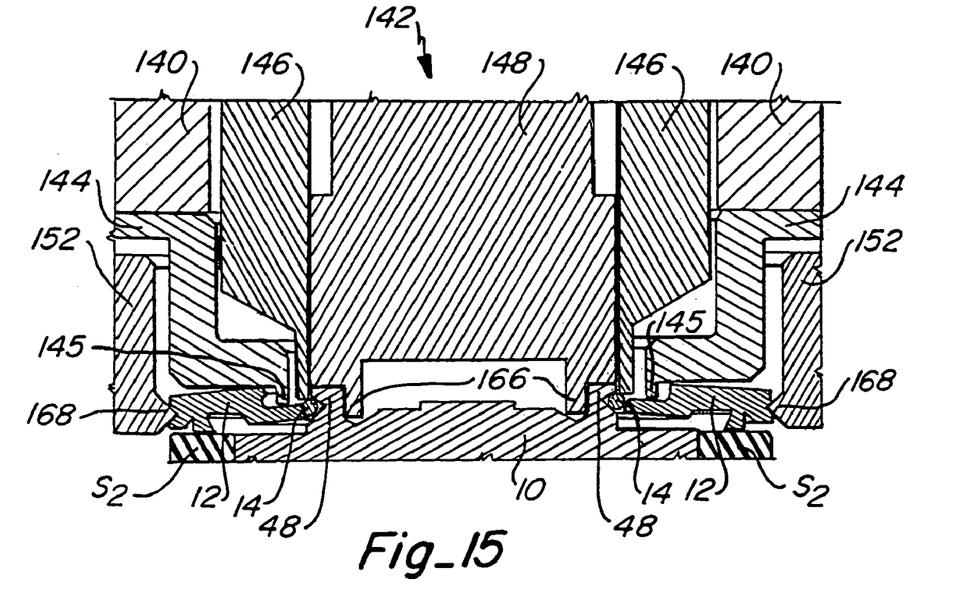
FIG. 15 is another enlarged vertical section illustrating the retainer ring after being emplaced in the groove of the hub.

Now referring to FIGS. 14 and 15, the clamp press member 144, includes a clamp press extension 145. The extension 145 contacts the disk clamp 12 for deflecting the disk clamp 12. The construction of the retainer ring applicator 142 is similar to the retainer ring applicator 102. Ring applicator 142 includes an outer sleeve 146 which is slidable over an inner core 148. A biasing member in the form of spring 150 biases the outer sleeve 146 to resist downward movement over the inner core 148.

Referring back to FIGS. 12 and 13, the press template 136 overlies at least a pair of clamp engaging segments 152. The clamp engaging segments 152 are normally spaced from one another as by a spring or biasing member 158. Clamp engaging segments 152 are mounted over a support ledge 156 which is not round, but is rather an oval shaped opening formed in the lower portion of the press table 132. The support ledge 156 not only provides a means to support and manipulate the clamp engaging segments, but also provides additional structural support to stabilize application of force onto the disk clamp. Furthermore, the support ledge 156 also serves as a protecting plate or member between the retaining ring applicator 142 and the disk drive to further limit the exposure of the disk drive to contamination during disk clamp installation. The disk clamp can be mounted within the device 130 by use of a disk clamp chuck 162 which is connected to an elevating pole 164. The upper edges or surface of the clamp chuck 162 may be designed for mating engagement with the disk clamp 12. The elevating pole 164 is then moved to place the disk clamp in the position shown in FIG. 12. In order to close the clamp engaging segments 152 around the disk clamp 12, a push rod 160 is provided so that a force slides or moves one of the engaging segments along ledge 156, thereby compressing biasing member 158 and closing the gap between the segments. Push rod 160 may be automatically driven by a remote forcing element (not shown), the push rod 160 being threaded to allow precise closing of the gap between segments 152. The biasing member 158 may be received in appropriately sized recesses/openings (not shown) in the corresponding side edges of the clamp engaging segments 152. FIG. 13 illustrates the push rod 160 displaced so that the engaging segments 152 are in contact with one another, thus fully securing the disk clamp. At this point, the disk clamp may then be loaded by the press assembly 138. Accordingly, the press assembly 138 is lowered such that the clamp press member 144 makes contact with the disk clamp without deflecting the clamp. The press assembly 138 is lowered in this initial step to ensure that the clamp press extension 145 is aligned with the groove 18 on the disk clamp. Once alignment is confirmed, then the disk clamp may be deflected by further lowering the press assembly 138. The press assembly 138 maintains the load on the disk clamp awaiting the positioning of the disk drive under the disk clamp. The disk drive D is then centered under the disk clamp, and as shown in FIG. 14, the hub 10 is inserted through the central opening in the disk clamp. The steps for emplacing the retainer ring in the second embodiment are the same as the first embodiment. FIG. 14 illustrates the retainer ring prior to emplacement wherein the retainer ring 14 is secured to the distal end of the inner core 148. FIG. 15 illustrates the outer sleeve 146 displaced downwardly over the inner core 148, thus pushing the retainer ring in the gap between the hub and the clamp. FIGS. 14 and 15 also illustrate other details to include the arrangement of core flange 166 which is shaped to mate with the exterior details of the hub. As with the clamp engaging segment 92 of the first embodiment, the clamp engaging segments 152 also each include a wedge shaped protrusion 168 which is received within the peripheral groove 31 of the disk clamp. Once the retainer ring has been emplaced, the press assembly 138 is lifted and the push rod 160 is disengaged. The disk drive with the installed disk clamp is prepared for further processing or testing.

Figure 16:
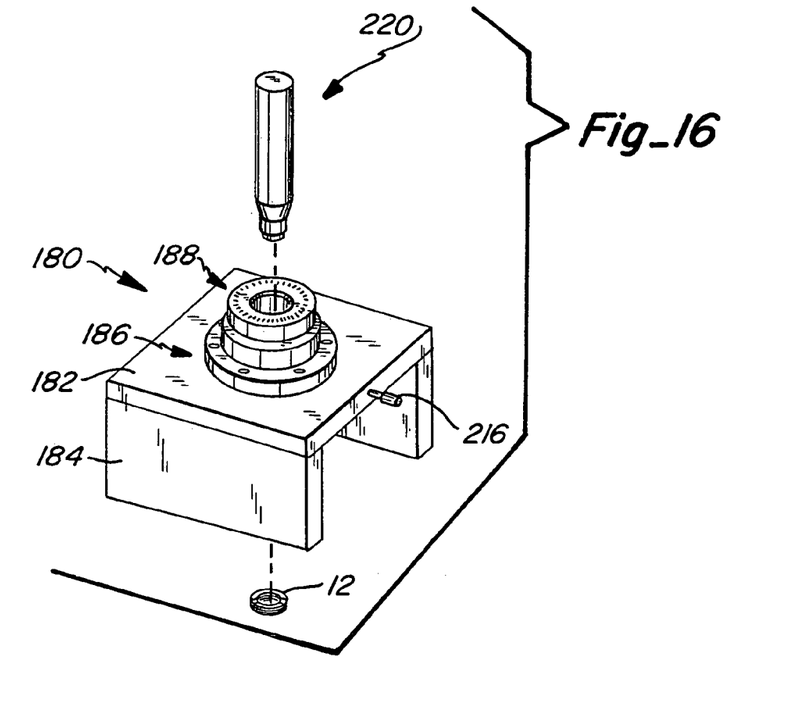
FIG. 16 is a perspective view of a third embodiment of the preloading device of the invention.
Figure 17:
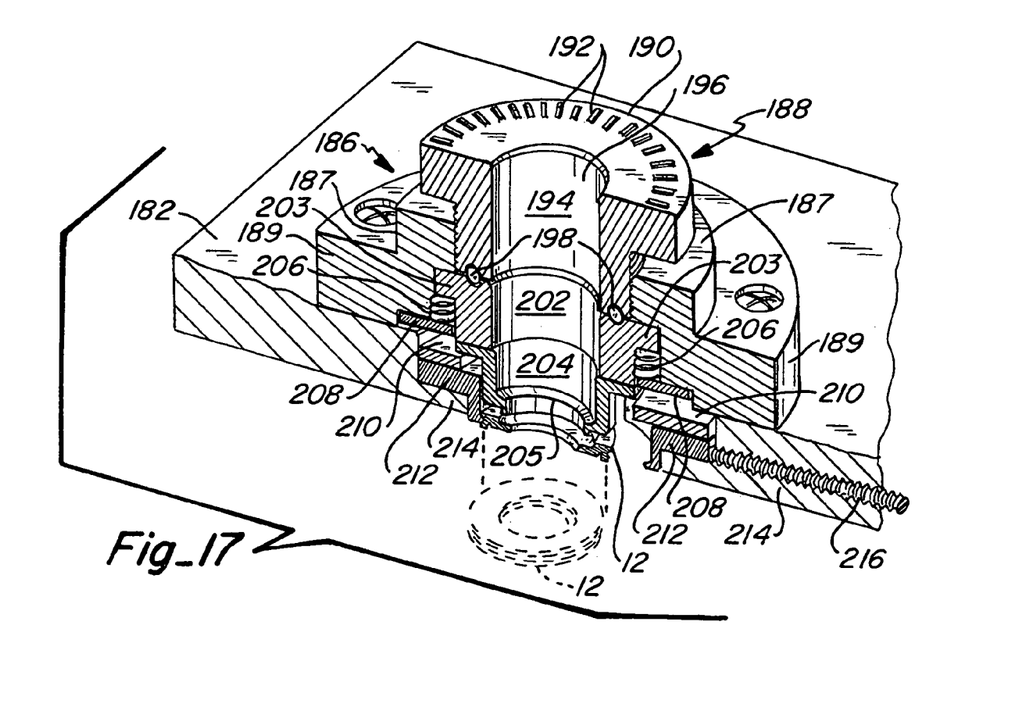
FIG. 17 is an enlarged fragmentary perspective view of the preloading device of FIG. 16, and illustrating a disk clamp being positioned for preloading.
Figure 18:
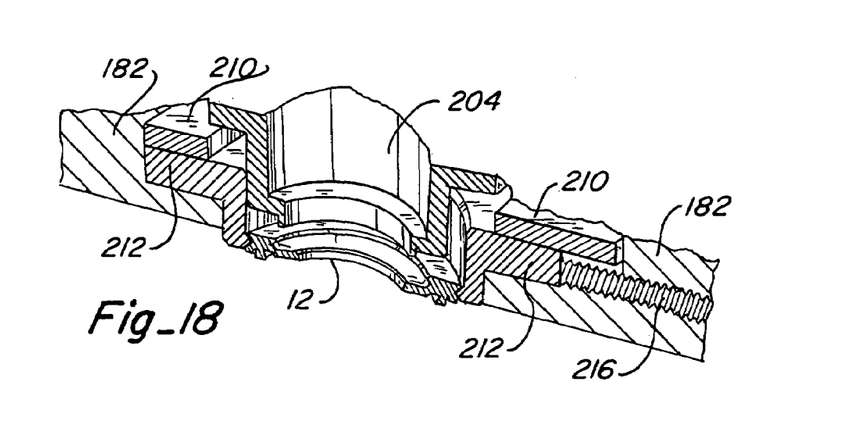
FIG. 18 is another fragmentary perspective view of the preloading device of FIG. 17 showing the disk clamp prepared for preloading.

Now referring to FIG. 16, a third embodiment of the preloading device is provided. This third embodiment may also be referred to as a screw type preloading device 180.

Figure 19:
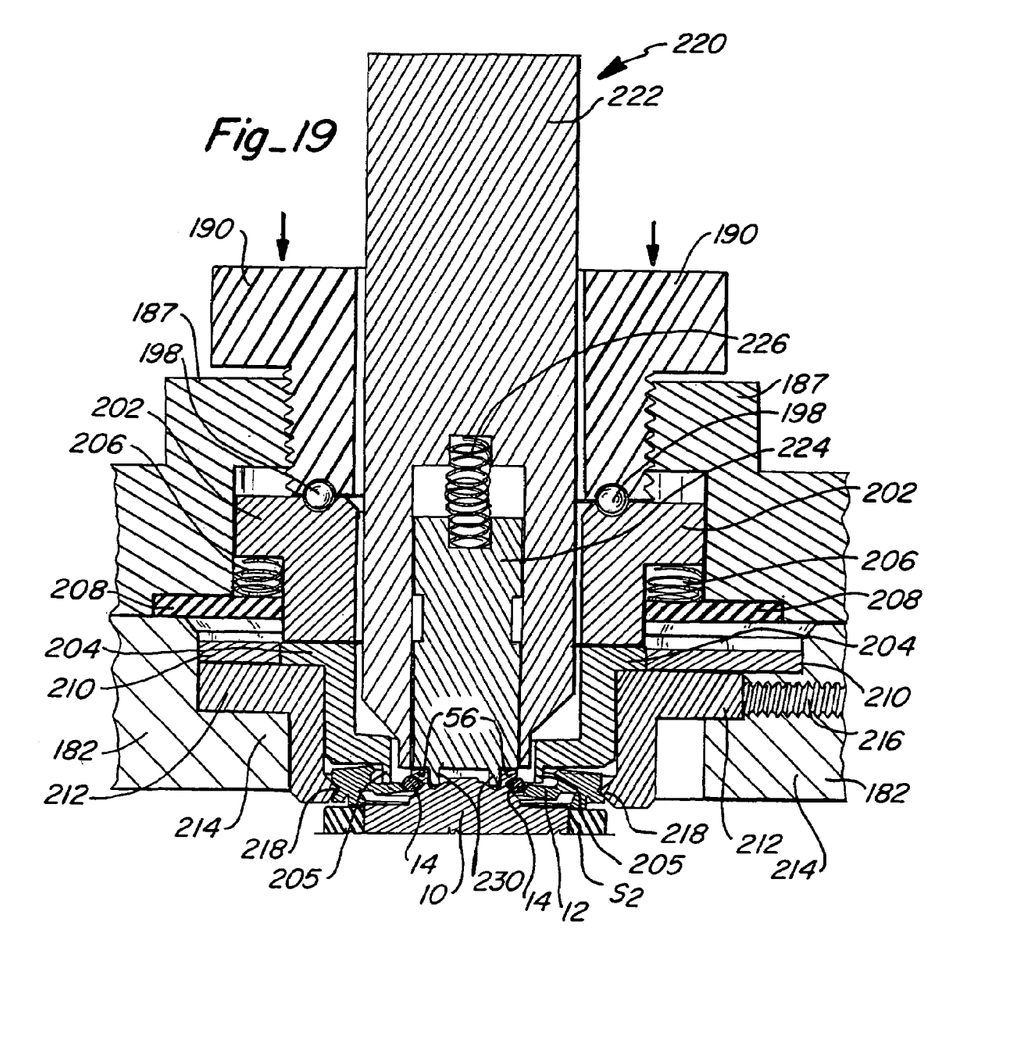
FIG. 19 is a greatly enlarged vertical section illustrating a disk drive aligned for installation of the disk clamp.

This preloading device 180 is well suited for manual manipulation of the disk clamp for testing or other purposes. The loading device 180 may include a press table 182, which is supported by leg/supports 184. A stabilizing mount assembly 186 is positioned over a tiered or stepped opening formed in the press table 182. The stabilizing mount 186 may include an upper tier 187, and an integral lower tier 189. A screw press member 188 for placing a force upon the disk clamp is received within a central opening in the stabilizing mount 186. The screw press member 188 includes an external head 190 having indicia 192. The indicia 192 may correspond to predetermined arc lengths. Rotation of the screw press member 188 within predetermined arcs corresponds to a particular amount of force placed upon the disk clamp. The press member 188 further includes a threaded press extension 194 which is received in the central opening formed in the upper tier 187. The screw press member 188 itself includes an opening 196 which receives a retainer ring applicator 220, as discussed further below. The lower or distal edge of the press extension 194 rests upon a plurality of ball bearings 198. An arcuate groove or slot may be formed in the lower edge of the press extension 194 to mate with the ball bearings 198. One or more force transferring members are positioned intermediate between the disk clamp 12 and the threaded press extension 194. As shown, an upper force transferring member 202 is also received in the opening of the stabilizing mount 186. The upper force transferring member 202 may also have an arcuate groove or slot formed in the upper edge thereof for receiving a lower portion of the set of ball bearings 198. The upper force transferring member 202 may include an upper flange 203, which accommodates an annular slot therebelow for receiving one or more springs or biasing members 206. An annular shaped stop ring 208 captures the springs 206 between the ring 28 and the flange 203. A clamp press member 204 is positioned directly below the upper force transferring member 202. The clamp press member 204 serves the same function as the clamp press members in the first two embodiments. As shown in FIG. 19, the clamp press member 204 also includes an annular shaped clamp press extension 205 which engages the upper surface of the disk clamp 12. Underlying the stop ring 208 is a press template 210, and at least a pair of clamp engaging segments 212. The clamp engaging segments 212 are supported upon an oval shaped support ledge 214. Thus, as with the second embodiment, the third embodiment also incorporates the use of a support ledge 214 upon which the clamp engaging segments 212 rest. This support ledge 214 helps to absorb load, thus stabilizing the overall arrangement of the preloading device, and further limits introduction of contamination into the disk drive. The purpose and functioning of the clamp engaging segments 212 is the same as that of clamp engaging segments 152. The support ledge 214 is oval shaped which allows the clamp engaging segments to be spaced from one another. A push rod 216 then forces the clamp engaging segments 212 together to secure the disk clamp 12. The disk clamp 12 in this third embodiment can be loaded in the device 180 manually, or with the aid of a clamp chuck of the type disclosed in the second embodiment. Once the clamp engaging segments 152 have been moved to their closed position, the clamp may be preloaded. This preloading is achieved by rotating the screw press member 188 a desired number of rotations/partial rotations. The user can be guided by the indicia 192 in determining the amount of rotation, thus the amount of force transferred to the disk clamp. Once the disk clamp has been preloaded, then the disk drive D may be positioned to insert the hub through the central opening in the disk clamp. Accordingly, the disk drive D is aligned with the loaded disk clamp by positioning the disk drive D under the press table 182. As shown in FIG. 19, the disk drive D has been aligned with the disk clamp. FIG. 19 also illustrates details to include a wedge shaped protrusion 218 which extends from the respective clamp engaging segments 212 for engaging the peripheral groove 31 of the disk clamp.

The retainer ring applicator 220 of the third embodiment is also similar to the retainer ring applicator of the previous embodiments. Specifically, the retainer ring applicator 220 includes an outer sleeve 222 which is a slidable over an inner core 224. A spring 226 is positioned within the inner core to bias the outer sleeve 222. A retainer ring 14 is placed over the distal end of the inner core 224. The retainer ring applicator 220 is then inserted within the opening 196, and the contacting flange 230 of the inner core 224 contacts the upper surface of the hub to align the retainer ring application with the hub. The outer sleeve 222 is pressed downward to dislodge the retainer ring from the distal end of the inner core 224, and to push the retainer ring in the gap between the clamp and the hub.

In each of the embodiments, after the disk clamp has been installed, the balance ring 16 may be inserted within the upper groove 18 of the disk clamp. As understood by those skilled in the art, the disk pack is spin balanced, and the balance ring is sized and positioned within the groove 18 to achieve balancing. During the preloading of the disk clamp, witness marks may be formed on the flat portion 40 of the groove 18. As discussed above, the clamp press extension preferably loads the disk clamp at this location. The balance ring may be sized to cover these witness marks, thus minimizing any particle generation which may occur by contact of the clamp press extension against the disk clamp.

In both the second and third embodiments, two or more clamp engaging segments may be used to secure the clamp. If two clamp engaging segments are used, then each would traverse an 180° arc. Each of the segments may be movable with respect to one another, i.e., each may be slidable along the support ledge. Alternatively, selected ones of the clamp engaging segments can be movable, while one or more of the other clamp engaging segments may be stationary.

The advantages of the disk clamp, the method of preloading the clamp, and the preloading device of this invention are numerous. With the disk clamp of this invention, screws are eliminated, and potential contamination due to the threading action of screws, screw head damage, thread damage, and improperly seated screws are eliminated.

By preloading the disk clamp, there is no need for a motor hub support to stabilize the motor hub during clamp installation. As a result, support holes and spanners are not needed which simplifies the overall disk drive assembly. Motor bearing damage is also reduced because no axial load is applied to the hub in installing the disk clamp. In general, preloading of the disk clamp eliminates other forces which may stress and damage the disk drive.

After the disk clamp has been preloaded, the balance ring placed within the groove can cover witness marks which may be a result of preloading the clamp. Therefore, covering the witness marks with the balance ring can also help prevent generated particles from contaminating the disk drive.

Preloading the disk clamp can be achieved either by preloading the clamp and then moving the clamp over the disk drive, or preloading the clamp and then moving the disk drive in alignment with the preloaded clamp. The first embodiment is more conducive to preloading the clamp and then moving the clamp over the disk drive, while the second and third embodiments are more conducive to moving the disk drive in alignment with the preloaded clamp. The embodiments of the preloading device of the invention are therefore versatile in their uses, and allow a user great flexibility in the method by which the disk clamp is to be preloaded and installed.

The preloading device of this invention is advantageous not only for installing the disk clamp, but also for removing the disk clamp for rework or repair of the disk drive. The process of removing the disk clamp is simply the reverse method of installing the disk clamp. Thus, the same advantages with respect to installing the clamp are also realized with uninstalling the clamp. Specifically, contamination, damage to the disk drive by loading, and other potential problems are reduced.

While the above description and drawings disclose and illustrate various embodiments and modifications to those embodiments, one should understand that the invention is not specifically limited to these embodiments. Those skilled in the art to which the invention pertains may make other modifications and may incorporate other embodiments employing the principles of this invention, particularly upon considering the foregoing teachings. Therefore, by the appended claims, Applicant intends to cover other modifications and embodiments which may constitute essential features of the invention.

What is claimed is:

1. A method of installing a disk clamp over a hub of a disk drive, said method comprising the steps of:
   providing a preloading device for applying a load to deflect the disk clamp;
   securing the disk clamp in the preloading device;
   manipulating the preloading device to apply a load to deflect the clamp and without said clamp and said preloading device contacting the hub of the disk drive during said manipulating to apply a load;
   positioning the preloading device over a housing of the disk drive, and aligning the clamp over the hub;
   installing a retainer ring between the hub and the disk clamp; and
   manipulating the preloading device to release the load.

2. A method, as claimed in claim 1, wherein: said step of manipulating the preloading device to apply a load to deflect the clamp is achieved by applying an axial load substantially perpendicular to a plane of the disk clamp.

3. A method, as claimed in claim 1, wherein:
   said disk clamp includes an annular body portion having upper and lower surfaces, a peripheral edge, a central opening for receiving the hub, a peripheral groove formed in said peripheral edge, and a flange integral with said body portion and extending downward from said lower surface of said annular portion.

4. A method, as claimed in claim 3, wherein:
   said preloading device further includes means for positioning a retainer ring in a gap between the hub and the disk clamp, said means for positioning being placed adjacent said central opening and then said means for positioning displacing the retainer ring over the hub.

5. A method, as claimed in claim 1, wherein:
   said preloading device further includes a clamp engaging member to secure the peripheral edge of the disk clamp, and a clamp press member mounted in the preloading device for contacting the upper surface of the disk clamp and to preload the disk clamp thus deflecting the disk clamp so it may be installed in the disk drive.

6. A method, as claimed in claim 5, wherein:
   said clamp engaging member further includes at least a pair of clamp engaging segments movable between an open position and a closed position, said closed position resulting in engagement of the peripheral edge of the disk clamp.

7. A method, as claimed in claim 1, wherein:
   said preloading device includes means for engaging a periphery of the disk clamp to secure the disk clamp in a stationary position, and means for applying a load to the disk clamp to deflect the disk clamp in a direction substantially perpendicular to a plane of the disk clamp.

8. A method, as claimed in claim 7, wherein said preloading device further includes:
   means for positioning the retainer ring to secure the disk clamp to the disk drive, said means for positioning cooperating with said applying means to position the retaining ring after the load has been applied to the disk clamp.

9. A method, as claimed in claim 7, wherein:
   said means for engaging includes at least a pair of clamp engaging segments movable between an open position and a closed position.

10. A method, as claimed in claim 7, wherein:
    said preloading device includes means for positioning the retainer ring in a gap between the hub of the disk drive and the disk clamp, said means for positioning contacting and displacing the retainer ring over the hub of the disk drive.

11. A method, as claimed in claim 1, wherein:
    said disk clamp includes an annular body portion extending along a plane and including upper and lower surfaces, a peripheral edge, and a central opening for receiving the hub, a peripheral groove formed in said peripheral edge and extending a selected distance around said peripheral edge, a flange integral with said body portion and extending downward from said lower surface of said annular body portion, and an upper concentric groove formed in said upper surface adjacent said central opening.

12. A method, as claimed in claim 11, further including:
    means for positioning the retainer ring to secure the disk clamp to the disk drive, said means for positioning being integral with said preloading device, wherein actuation of the means for positioning causes the retainer ring to be emplaced in a gap between the hub and the disk clamp.

13. A method, as claimed in claim 1, wherein:
    said preloading device includes a clamp engaging member for engaging a periphery of the disk clamp to be installed, said clamp engaging member securing the disk clamp in a stationary position;
    a clamp press member mounted in said preloading device for selectively applying a load to the disk clamp to deflect the disk clamp; and
    means for positioning the retainer ring in a gap between the hub and the disk clamp, said means for positioning being movable between a first position and a second position for displacing the retainer ring over the hub.

14. A method, as claimed in claim 13, wherein:
    said clamp engaging member is shaped to conform to the periphery of the disk clamp.

15. A method, as claimed in claim 13, wherein:
    said clamp engaging member further includes at least a pair of clamp engaging segments movable between an open position and a closed position, said closed position forming a continuous ring which engages the periphery of the disk clamp.

16. A method, as claimed in claim 13, wherein:
said clamp engaging member further includes a protrusion extending therefrom which contacts a complementary groove formed in the periphery of the disk clamp.

17. A method, as claimed in claim 13, wherein:
said clamp press member engages an upper surface of the disk clamp to deflect the disk clamp downward in a direction substantially parallel to a plane of the disk clamp.

18. A method, as claimed in claim 13, wherein:
said clamp press member is annular shaped to uniformly engage the disk clamp.

19. A method, as claimed in claim 13, wherein:
said clamp press member includes a press extension forming a distal end thereof for contacting an upper surface of the disk clamp.

20. A method, as claimed in claim 13, wherein:
said means for positioning includes an outer sleeve, an inner core slidably received in said outer sleeve, and a biasing means for biasing sliding engagement between the inner core and the outer sleeve.

21. A method, as claimed in claim 13, wherein:
said means for positioning includes an outer sleeve and an inner core slidably received in said outer sleeve, and wherein the retainer ring is mounted over the inner core in the first position, and said outer sleeve being slidable over said inner core in the second position to engage the retainer ring mounted over said inner core thus displacing the retainer ring over the hub.

22. A method, as claimed in claim 13, wherein:
said clamp press member further includes a rotatable handle communicating with said clamp press member enabling a user to manipulate the handle to apply a load through said clamp press member.

23. A method, as claimed in claim 13, wherein:
said preloading device further includes a rotatable screw press mounted to said device and being rotatable to engage said clamp press member for transferring a load through said clamp press member to the disk clamp.

24. A method of installing a disk clamp over a hub of the disk drive, said method comprising the steps of:
providing a preloading device for applying a load to deflect the disk clamp prior to mounting of the disk clamp over the hub;
securing the disk clamp in the preloading device;
manipulating the preloading device to apply a load to deflect the clamp;
positioning a housing of the disk drive in alignment with the disk clamp secured in the preloading device, and inserting the hub through the disk clamp;
installing a retainer ring between the hub and the disk clamp; and
manipulating the preloading device to release the load.

25. A method, as claimed in claim 24, wherein:
said step of manipulating the preloading device to apply a load to deflect the clamp is achieved by applying an axial load substantially perpendicular to a plane of the disk clamp.

26. A method of preloading a disk clamp for subsequent installation of the disk clamp in a disk drive, said method comprising the steps of:
providing a preloading device;
securing the disk clamp in the preloading device;
manipulating the preloading device to apply a load to deflect the clamp prior to installation of the disk clamp in the disk drive; and
securing the load on the disk clamp to maintain the disk clamp in a deflected state.

27. The method, as claimed in claim 26, wherein:
said manipulating step is achieved by applying an axial load substantially perpendicular to a plane of the disk clamp.

28. A method, as claimed in claim 26, wherein said manipulating step further comprises the step of:
applying the load to deflect the clamp by rotating a handle attached to the preloading device, and contacting a force transferring member which transfers the load to the disk clamp.

29. A method, as claimed in claim 26, wherein said manipulating step further comprises the step of:
rotating a screw press mounted to the preloading device, the screw press transferring the load to the disk clamp.

30. A method, as claimed in claim 26, wherein said manipulating step further comprises the step of:
moving a press member to contact the disk clamp, and applying the load through the press member.

31. A method, as claimed in claim 26, wherein:
said preloading device includes a frame for receiving the disk clamp, said frame including a pair of clamp engaging segments movable between an open position, and a closed position to engage a periphery of the disk clamp to secure the disk clamp in a stationary position;
a clamp press member rotatably mounted to said frame for selectively applying a load to the disk clamp, said clamp press member having an opening formed therethrough; and
a force applying member mounted to said frame and selectively engageable with said clamp press member to transfer force through said clamp press member to apply the desired load to the disk clamp.

32. A method, as claimed in claim 31, wherein:
said preloading device further includes a retainer ring applicator for positioning a retainer ring in engagement with the disk clamp, said retainer ring applicator being inserted through said opening of said clamp press member.

33. A method, as claimed in claim 31, wherein:
said preloading device further includes a rotatable press bracket rotatably mounted to said frame, and a clamp press member mounted to said rotatable press bracket, wherein the rotatable press bracket is selectively rotated to place said clamp press member in contact with the disk clamp.

34. A method, as claimed in claim 26, wherein:
said preloading device includes at least a pair of clamp engaging segments mounted in said device for engaging a periphery of the disk clamp to be installed, said clamp engaging segments being selectively movable between a first open position, and a second closed position which secures the disk clamp in a stationary position; and
a press assembly positioned over said clamp engaging segments and movable between a disengaged position, and an engaged position to preload the disk clamp and to emplace a retainer ring between the hub and the disk clamp, said press assembly including a clamp press member mounted to a distal end of said press assembly, said clamp press member contacting the disk clamp to apply the load to the disk clamp, said press assembly further including a retainer ring applicator disposed within the press assembly and aligned with the disk clamp to emplace the retainer ring between the hub and the disk clamp, the retainer ring applicator including an outer sleeve which displaces the retainer ring between the hub and the disk clamp.

35. A method, as claimed in claim 34, wherein:
said preloading device further includes means for moving said at least a pair of clamp engaging segments between the first and second positions, said means including a biasing member positioned between the at least a pair of clamp engaging segments, and a push rod engaging one of said at least a pair of clamp engaging segments to selectively displace the clamp engaging segment in a position to secure the disk clamp in the stationary position.

36. A method, as claimed in claim 34, wherein:
said preloading device further includes a disk clamp chuck mounted below said press assembly and selectively movable to place the disk clamp in a position for engagement by said at least a pair of clamp engaging segments.

37. A method, as claimed in claim 26, wherein:
said preloading device includes a clamp engaging member mounted in said preloading device for engaging a periphery of the disk clamp to be installed, said clamp engaging member securing the disk clamp in a stationary position;
a screw press member mounted in said preloading device for selectively applying a load to the disk clamp, said screw press member being rotated to apply the load in desired increments, said screw press member having an opening formed therethrough; and
a retainer ring applicator for positioning a retainer ring in a gap between the hub and the disk clamp, said retainer ring applicator being inserted through said opening of said screw press member.

38. A method, as claimed in claim 37, wherein:
said clamp engaging member is shaped to conform to the periphery of the disk clamp.

39. A method, as claimed in claim 37, wherein:
said clamp engaging member further includes at least a pair of clamp engaging segments movable between an open position and a closed position.

40. A method, as claimed in claim 37, wherein:
said screw press member transfers force to an upper surface of the disk clamp to deflect the disk clamp downward in a direction substantially parallel to a plane of the disk clamp.

41. A method, as claimed in claim 37, wherein:
said screw press member includes a clamp press member extending therefrom for contacting an upper surface of the disk clamp, said clamp press member being annular shaped to uniformly engage the disk clamp.

42. A method, as claimed in claim 37, wherein:
said retainer ring applicator includes an outer sleeve, an inner core slidably received in said outer sleeve, and a biasing means for biasing sliding engagement between the inner core and the outer sleeve.

43. A method, as claimed in claim 37, wherein:
said screw press member includes a clamp press member for engaging an upper surface of the disk clamp, a threaded press extension mounted adjacent the clamp press member and being rotatable to transfer a force to the disk clamp, and an upper force transferring member positioned between said press extension and said clamp press member.

* * * * *